I. N. Coffin,
Steam-Boiler Water-Feeder,
No. 69, Reissued Apr. 26, 1845.
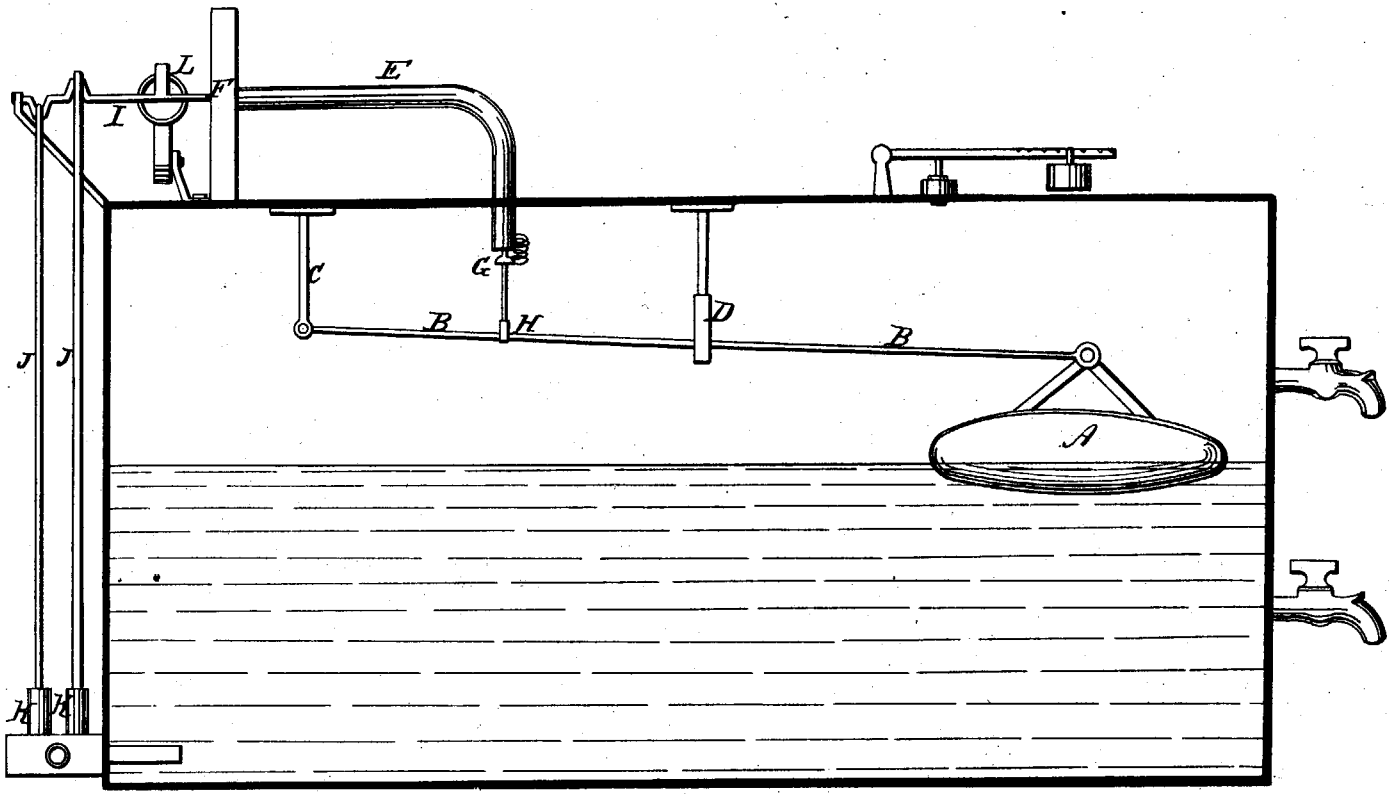
AM. PHOTO-LITHO. CO. N. Y. (OSBORNE'S PROCESS.)

UNITED STATES PATENT OFFICE.

ISAAC N. COFFIN, OF WASHINGTON, DISTRICT OF COLUMBIA.

IMPROVEMENT IN THE MODE OF SUPPLYING STEAM-BOILERS WITH WATER TO PREVENT EXPLOSIONS.

Specification forming part of Letters Patent No. 1,353, dated September 30, 1839; Reissue No. 69, dated April 26, 1845.

*To all whom it may concern:*

Be it known that I, ISAAC N. COFFIN, of the city of Washington, in the District of Columbia, have invented certain improvements in the boilers of steam-engines, by means of which improvements the dangers of explosion from a deficiency of water in the boiler will be lessened, if not entirely obviated; and I do hereby declare that the following is a full and exact description thereof.

The nature of my invention consists in the so adapting and combining of a float within the boiler with a valve, steam-engine, and supply-pump as that by the lowering of the water in the boiler, and the consequent depression of the float, a portion of the steam will escape, and in so doing shall give motion to the steam-engine and the pump for supplying the boiler with water.

The accompanying drawing represents the interior of a boiler, one side of which is removed for the purpose of exhibiting the operating parts.

A is a float, which may be of metal or other suitable material. This is attached to a rod, B B, which at its opposite end works on a joint, by which it is connected to a support, C. The support D has a slot in it, through which the rod passes and by which it is guided as it moves up and down.

E is an escape-tube, the inner end of which opens into the steam-chamber of the boiler, and its outer end is connected to a steam-engine. F, which may operate in the manner of what is known as "Avery's rotary steam-engine," or in any of the other known modes in which such engines, whether rotary or reciprocating, are made to operate.

To the inner end of the escape-tube E is adapted a valve, G, which is opened or closed by the action of the float upon the rod or lever B B. The valve G is to be kept in contact with its seat E by means of a spiral or other spring when not forced down by the descent of the float. The lower end of the valve-stem H is not attached to the rod B B, but is furnished with a slot or long mortise, within which said rod can play up and down to the distance required for the free motion of the float, so that the valve shall not be disturbed by it until the float sinks to such a depth as to render it proper to open the valve, when the rod B B is brought into forcible contact with the lower end of the slot in H. A crank-shaft, I, which is driven by the rotary engine, works the pumps K K, which are constructed in the ordinary manner.

L is a bell, which will sound an alarm as soon as the shaft I begins to revolve, there being a tappet on said shaft for that purpose.

The ordinary safety-valves and gage-cocks are used with this boiler as with others.

What I claim as new, and desire to secure by Letters Patent in the above-described apparatus, is—

The combination of the float with the valve, steam-engine, and supply-pumps, substantially as herein described, so that the depression of the float caused by a deficiency of water shall open a valve, and that the steam which escapes through said opening shall drive an engine to operate the supply-pumps.

ISAAC N. COFFIN.

Witnesses:

THOS. HAVENNER,

DANIEL SMITH.